Sept. 15, 1931.  A. ZAHN  1,823,247
PROTECTING OR SAFETY SEAT FOR WINDOW CLEANERS
Filed March 25, 1930
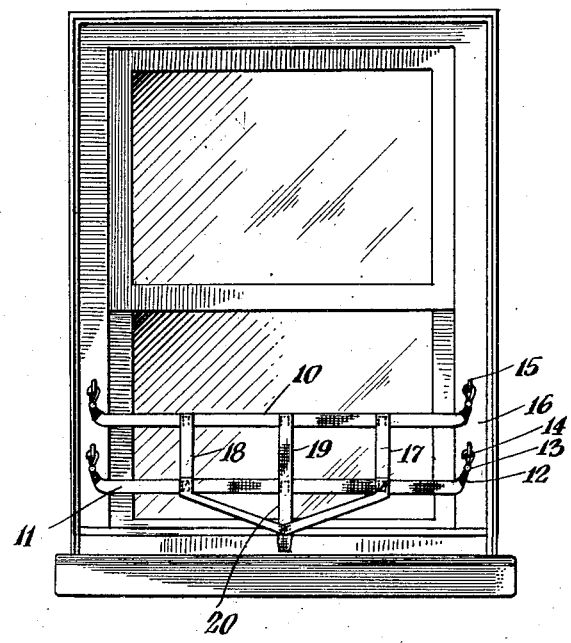
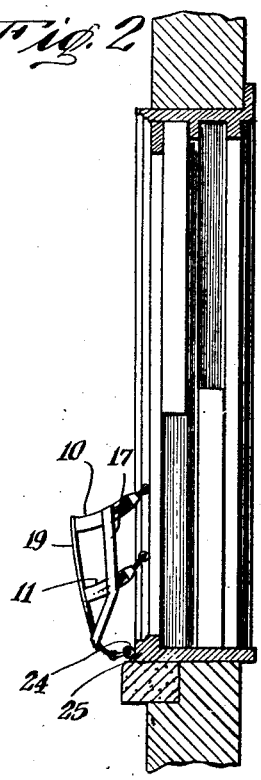
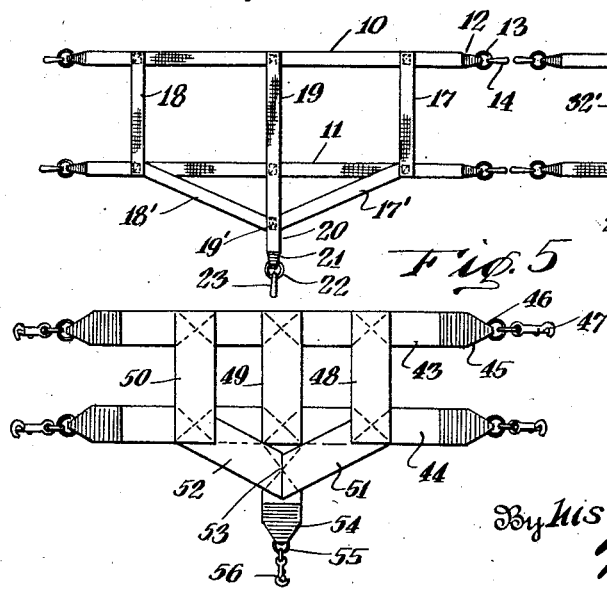
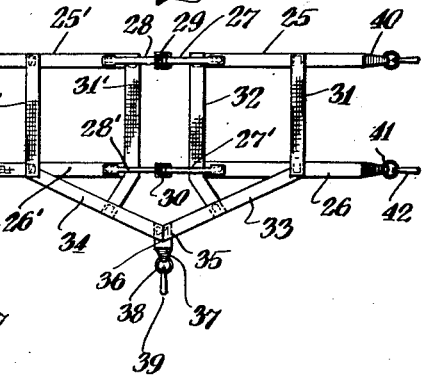
Inventor
Adam Zahn
By his Attorney Patented Sept. 15, 1931

1,823,247

UNITED STATES PATENT OFFICE

ADAM ZAHN, OF LONG ISLAND CITY, NEW YORK

PROTECTING OR SAFETY SEAT FOR WINDOW CLEANERS

Application filed March 25, 1930. Serial No. 438,716.

This invention relates to improvements in protecting or safety devices and particularly to a safety harness for window cleaners, and it is the principal object of my invention to provide a harness of great strength forming a comfortable seat for the window cleaner, and allowing a ready attachment to and detachment from a window frame.

Another object of my invention is the provision of a window cleaner's seat in form of a harness composed of longitudinally extending and crosswise connected straps which may be upholstered with soft material on their inner faces and which have their ends formed from leather for holding rings to which snap hooks are secured allowing an attachment of the ends of the harness to eyes in the window frame and sill thereof.

A further object of my invention is the provision of a protecting seat for window cleaners of comparatively simple and inexpensive construction yet durable and efficient in operation.

A still further object of my invention is the provision of a window cleaner's seat in form of a harness which allows an adjustment of the harness to suit the particular width of a window.

These and other objects and advantages of my invention will become more fully known, as the description thereof proceeds, and will then be specifically defined in the appended claims.

In the accompanying drawings forming a material part of this disclosure:

Fig. 1 is a front elevation of a window cleaner's seat constructed according to my invention.

Fig. 2 is a sectional end elevation thereof.

Fig. 3 shows the harness flattened.

Fig. 4 illustrates a modified form of harness.

Fig. 5 illustrates another modification of the harness.

As illustrated, the harness seat is composed of two parallel longitudinally extending straps 10 and 11 of suitable strong material suitably provided or upholstered with an inner soft lining, and leather ends 12 to which rings 13 are attached or secured for the holding of the snap hooks 14 by means of which the straps may be attached to eyes 15 driven into the wood of the window frame 16.

Near their ends the parallel longitudinal straps are united by means of cross straps 17, 18, having their ends connected to straps 10 and 11.

A median strap 19 connects the longitudinal straps 10 and 11, and is extended beyond strap 11, as indicated at 20.

The end of strap 20 is preferably also made of leather 21 to hold a ring 22 for the attachment of snap hooks 23 by means of which the strap 19 can be attached to an eye 24 secured in the window sill 25 of the frame 16. Braces 17', 18' are connected to the lower ends of straps 17 and 18 and at their meeting ends are connected to strap 19, as at 19'.

In the modified form of strap illustrated in Figure 4 the parallel longitudinal straps 25, 25', 26, 26', are made in two parts to the inner ends of which straps 27, 28, 27', 28' are attached, the ends of which are united by buckles 29, 30.

Straps 25, 26, and straps 25', 26' are connected by cross straps 31, 32 and 31', 32' respectively and to the ends of straps 31, and 32' are attached braces 33, 34, angularly disposed to said straps 31, and 32' and united at their meeting ends as at 35 where a short strap 36 is attached at one end the other end of which is preferably made of leather 37 for holding a ring 38 to which is attached a snap hook 39.

The outer ends of straps 25, 25' and 26, 26' are also made of leather, as indicated at 40 to hold rings 41 for the securing of the snap hook 42. The ends of straps 32, 31', are extended beyond straps 26, 26' and connected to braces 33, 34.

In the modified form of my invention shown in Figure 5 the harness is composed of two comparatively wide longitudinally extending straps 43, 44 having leather ends 45 holding rings 46 for the attachment of the snap hooks 47.

The longitudinal straps 43, 44, are connected by cross-straps 48, 49, and 50, and braces 51, 52, are attached to the lower ends of straps 48, and 50 and at their inner meeting ends the braces are secured to the extended lower end of the middle strap 49, as at 53.

The extended end of the median strap 49 is also made from leather, as at 54, holding a ring 55 for the attachment of a snap hook 56 by means of which the strap may be attached to an eye on the window sill.

The practical use of my invention will be clear from the above description and from the drawings, and it will be evident that the harness by virtue of its strong construction will present a safe seat for a window cleaner, and the leather ends, rings and hooks will allow a ready attachment to and removal from a window frame. An adjustment to the size of the window opening will be possible by the suitable lengthening or shortening of straps 27, 28, by means of buckles 29.

It will be understood that my invention is susceptible of various changes in its form, proportions and minor details, of construction, and I desire herein to reserve my right to make such changes as properly fall within the scope of the appended claims.

Having thus described my invention what I claim as new and desire to secure by Letters Patent is:

1. A protective device for window cleaners comprising a harness composed of longitudinal, spaced, parallel straps, cross straps connecting the longitudinal straps, braces bracing some of the cross-straps to the median cross-strap, rings at the ends of the longitudinal straps, a ring at the end of the median cross strap, and snap hooks secured in said rings for attachment of the straps to eyes in the window frame.

2. A window cleaner's seat in form of a harness comprisng a plurality of intersecting fabric straps connected at their points of intersection, leather ends for said straps, braces bracing some of the straps, rings held in said leather ends, and snap hooks attached to said rings for removably securing the strap ends to eyes in a window frame and its sill.

3. A window cleaner's seat in form of a harness composed of two sets of straps each comprising a plurality of separated longitudinal straps, means for adjustably connecting the separated strap sets, braces bracing some of the straps, and means for attaching said harness to a window frame.

4. A window cleaner's seat comprising a harness composed of comparatively wide longitudinally extending straps, cross-straps parallel to and spaced from each other connecting said longitudinal straps, braces connecting the ends of two of the cross-straps with the end of a third cross strap, and means at the ends of the longitudinal straps and median cross strap for attaching the harness to a window frame.

In witness whereof I have signed my name to this specification.

ADAM ZAHN.